Nov. 11, 1930.  P. KELLER  1,781,658
MOLD
Filed April 17, 1928
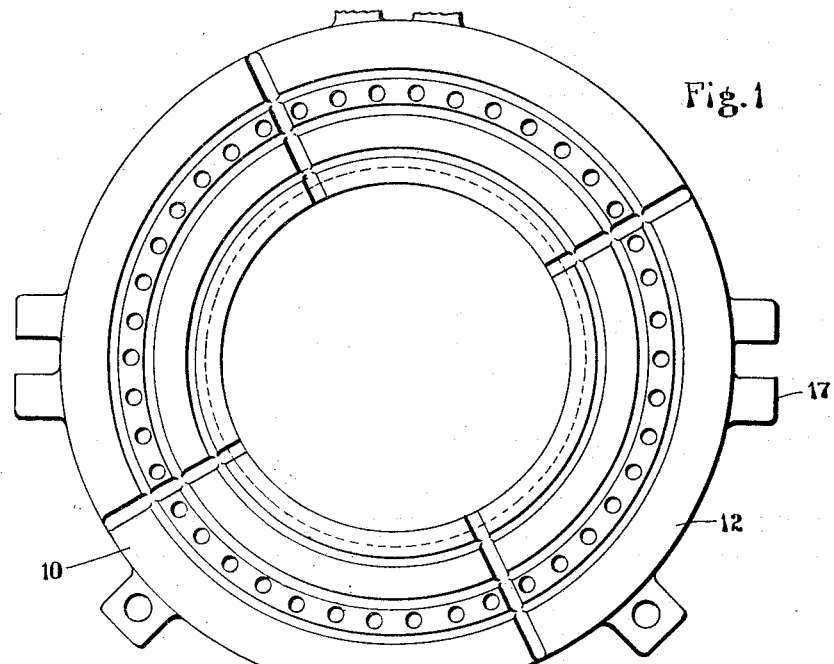
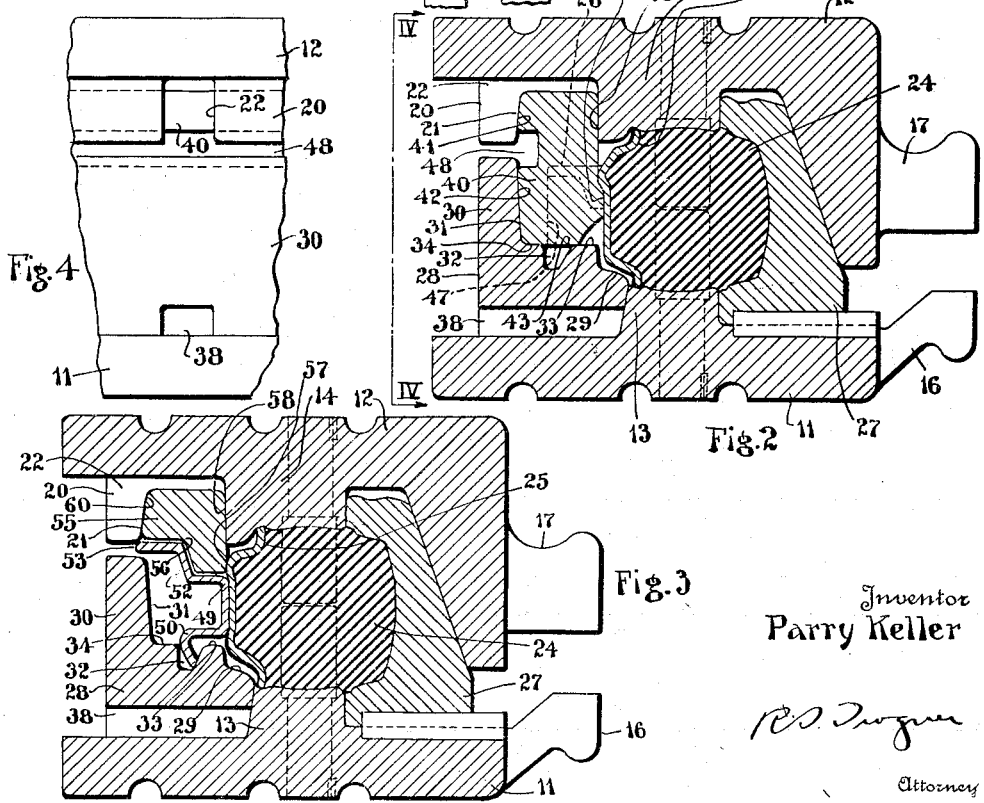
Inventor
Parry Keller
Attorney Patented Nov. 11, 1930

1,781,658

UNITED STATES PATENT OFFICE

PARRY KELLER, OF AKRON, OHIO, ASSIGNOR TO THE GOODYEAR TIRE & RUBBER COMPANY, OF AKRON, OHIO, A CORPORATION OF OHIO

MOLD

Application filed April 17, 1928. Serial No. 270,676.

My invention relates to vulcanizing apparatus, and it has particular relation to the molding devices employed in curing solid or cushion tires.

The object of the invention is to provide a single molding device, provided with interchangeable elements which adapt it for molding cushion tires having various types of base band constructions.

Solid or cushion tires, initially are mounted upon annular supporting structures known as base bands, and thereafter are vulcanized in suitable molding devices. One type of the base bands is provided with integral adapting members for adapting the tire to the felloe of a wheel of relatively small diameter, while others are not provided with adapting members, but instead are mounted directly upon the felloe. Heretofore, the curing of the tires was accomplished by employing one form of molding device to cure the tire equipped with an adapting member, and another form to cure the tire not provided with an adapting member. Considerable expense, therefore, was involved in supplying two molding devices for curing tires of equal dimensions, but having different supporting structures.

This invention obviates the disadvantages heretofore mentioned, by providing a single molding device for curing solid or cushion tires equipped either with or without an adapting member. The molding device includes a plurality of interchangeable base rings, which are selectively employable in the curing of tires having either form of the supporting structures referred to.

For a better understanding of the invention, reference may now be had to the accompanying drawings, forming a part of this specification, in which;

Figure 1 is a plan view of a molding device constructed according to the invention;

Figure 2 is a cross-sectional view, on a larger scale, of the molding device and tire therein, in which the supporting structure of the tire is of ordinary construction;

Figure 3 is a cross-sectional view, on a larger scale, of the molding device and tire therein, in which the supporting structure of the tire is formed with an adapting member; and Figure 4 is a fragmentary view, taken substantially in the direction indicated at IV—IV in Figure 2.

In practicing the invention, a mold 10 is provided having a lower plate 11 and an upper plate 12. The lower plate 11 is formed with a tire supporting flange 13 on its upper surface, intermediately of its inner and outer edges, while the upper plate 12 has on its lower surface a similarly formed flange 14. Lugs 16 and 17, integral with the lower and upper plates, respectively, facilitate movement of the mold from one position to another. Adjacent its inner edge, the upper plate has an integral annular flange 20, having an outer inclined peripheral surface 21. Circumferentially spaced openings 22 in this flange 20 facilitate the removal of the upper plate 12 of the mold, as will be referred to hereinafter.

The molding plates, in assembled relation, receive a tire 24 which, in the particular construction shown, is of a cushion type, and is supported upon a conventional base band 25, having lugs 26 (shown in broken lines) for securing it to the felloe of a wheel. A tire tread forming plate 27, mounted between the lower and upper plates of the mold, abuts the tread portion of the tire while the flanges 13 and 14 of the lower and upper plates 11 and 12, respectively, support the sidewalls thereof.

Directly below the flange 20 of the upper plate of the mold, is a base ring 28, which rests upon the lower molding plate 11. Adjacent its outer edge and on its upper side, this base ring is provided with an arcuate or concave surface 29, which is juxtaposed to the base band 25 of the tire for the purpose of reinforcing the latter. An upwardly extending flange 30 forms a part of the base ring 28 and has its outer peripheral surface 31 inclined similarly to the inclined surface 21 of the flange 20, but extending in an opposite direction. Between the arcuate surface 29 and the flange 30 a groove 32 is provided having plane surfaces 33 and 34 flanking its edges, which merge into the surfaces 29 and 31, respectively. Circumferentially spaced openings 38 in the lower portion of the base ring 28 permits the insertion of the end of a suitable mold-breaking tool, such as an elongated bar, to remove the ring from the lower plate 11 of the mold. The construction so far described is common to both Figures 2 and 3.

Referring now to Figure 2, a base ring 40 mounted between the lower and upper plates of the mold has oppositely inclined surfaces 41 and 42, which rest against the inclined surfaces 21 and 31, respectively. The lower side 43 of this base ring is supported upon the plane surfaces 33 and 34 of the base ring 28. A portion 45 of the outer peripheral surface of the base ring 40 abuts the base band 25 of the tire to reinforce the latter, while another portion 46 abuts the flange 14 in the upper plate 12 of the mold. Notches 47 (shown in broken lines) provided in the outer portion of the base ring 40, extend to the lower side of the ring, and receive the lugs 26 of the base band 25 of the tire 24. Removal of the base ring 40 is facilitated by inserting and manipulating a tool into a groove 48 in the base ring.

With the parts in assembled relation, removal of the upper plate 12 is accomplished by operating hoisting apparatus adapted to be attached to the lugs 17, or if necessary by inserting the tool referred to into the slots 22 and utilizing the base ring 40 as a fulcrum. The ring 40 may be removed by inserting the end of the tool into the groove 48, and utilizing the flange 30 as a fulcrum. Usually the tire is displaced along with the removal of the base ring 40, because of the engagement of the ring with the base band of the tire. If the construction of the tire is such that it is not displaced by the removal of the ring 40, it may be displaced simultaneously with the removal of the ring 28. As previously stated, removal of the last mentioned base ring is facilitated by a tool inserted into slot 38, so that the ring may be pried away from the lower plate 11 of the mold.

According to the construction shown by Figure 3, the base band 25 of the tire has an adapting member 49 secured thereto. This adapting member which is of conventional construction, has a flange 50 projecting into the groove 32 in the base ring 28, and an angular portion 52 having an extension 53 disposed adjacent the edges of the flanges 20 and 30. It will be apparent, therefore, that when the adapting member is in its operative position, a base ring 40, employed in the construction shown by Figure 2, cannot be utilized. Instead, a base ring 55 is provided, having an angular lower side 56, which rests upon the angular portion 52 of the adapting member. A portion 57 of this base ring abuts the base band 25 of the tire to reinforce the latter, while another portion 58 rests against the flange 14 of the upper plate of the mold. The inner periphery 60 of the base ring 55 is inclined similarly to the inclined surface 41 on the base ring 40 of Figure 2, and in like manner rests against the inclined surface 21 of the flange 20.

Separation of the plates 11 and 12 is accomplished in the same manner as described relative to Figure 2. The base ring 55, if it does not adhere to the upper plate 12 in the removal of the latter, either is removed separately following the lifting of the upper plate, or it may be removed simultaneously with the removal of the tire 24 and the base ring 28.

From the foregoing description, it will be apparent that by employing the construction shown by Figure 2, a cushion tire having an ordinary base band, as indicated at 25, may be cured, whereas by employing the construction shown by Figure 3, a cushion tire equipped with an adapting member may be cured. Consequently, it is necessary only that a single molding device be provided having interchangeable base rings. The changing of the base rings is a simple operation requiring but little labor. Moreover, in employing a single molding device, less expense is involved in the cost of the molds.

Although I have illustrated only the preferred forms which the invention may assume and have described those forms in detail, it will be apparent to those skilled in the art that the invention is not so limited, but that various minor modifications may be made therein without departing from the spirit of the invention or from the scope of the appended claims.

What I claim is:

1. In a molding device for curing cushion tires supported upon base bands, having upper and lower plates, a base ring on the lower plate having an annular groove in its upper side adapted to accommodate a portion of a felloe adapting member integral with the base band of a cushion tire, and a second base ring above the first base ring and in contact with the upper plate, the base rings being adapted to reinforce the base band of the cushion tire during curing thereof.

2. In a molding device for curing cushion tires supported upon base bands, having upper and lower plates, a base ring on the lower plate having an annular groove in its upper surface, approximately centrally of its inner and outer peripheries, said groove being adapted to accommodate a portion of a felloe adapting member integral with the base band of a cushion tire, and a second base ring above the first base ring and in contact with the upper plate, the base rings being adapted to reinforce the base band of the cushion tire during curing thereof.

3. A molding device for curing cushion tires supported upon base bands, comprising upper and lower plates, a base ring on the lower plate having a concave surface adjacent its outer periphery, adapted to reinforce the base band of a cushion tire during vulcanization, said base ring also having an annular groove adapted to receive a portion of a felloe adapting member integral with the base band of the tire, a second base ring having its lower surface conforming with the upper surface of the adapting member and adapted to rest thereupon, the outer periphery of the second base ring being in abutting relation with the base band of the tire to reinforce the same, and a flange integral with the upper plate and adapted to hold the second base ring in its proper position in the mold.

4. A molding device for curing tires supported upon base bands, comprising upper and lower plates, a base ring on one of the plates for accommodating a portion of a felloe adapting member integral with the base band of a tire, and a plurality of other base rings adapted to be employed selectively between the plates and in conjunction with the first mentioned base ring, for curing selectively tires supported on base bands provided with adapting members, and tires supported on base bands free from such adapting members.

5. A molding device for curing tires supported upon base bands, comprising upper and lower plates, a base ring on the lower plate having an annular groove in its upper surface for accommodating a portion of a felloe adapting member integral with the base band of a tire, and a plurality of other base rings adapted to be employed selectively between plates in conjunction with the first mentioned base ring, for vulcanizing selectively, tires supported on base bands provided with adapting members, and tires supported on base bands free from such adapting members.

In witness whereof, I have hereunto signed my name.

Signed at Akron, in the county of Summit and State of Ohio, U. S. A., this 16th day of April, 1928.

PARRY KELLER.